April 1, 1947. C. H. PETSKEYES 2,418,276
BREAD WRAPPING MACHINE
Filed June 9, 1945 3 Sheets-Sheet 2
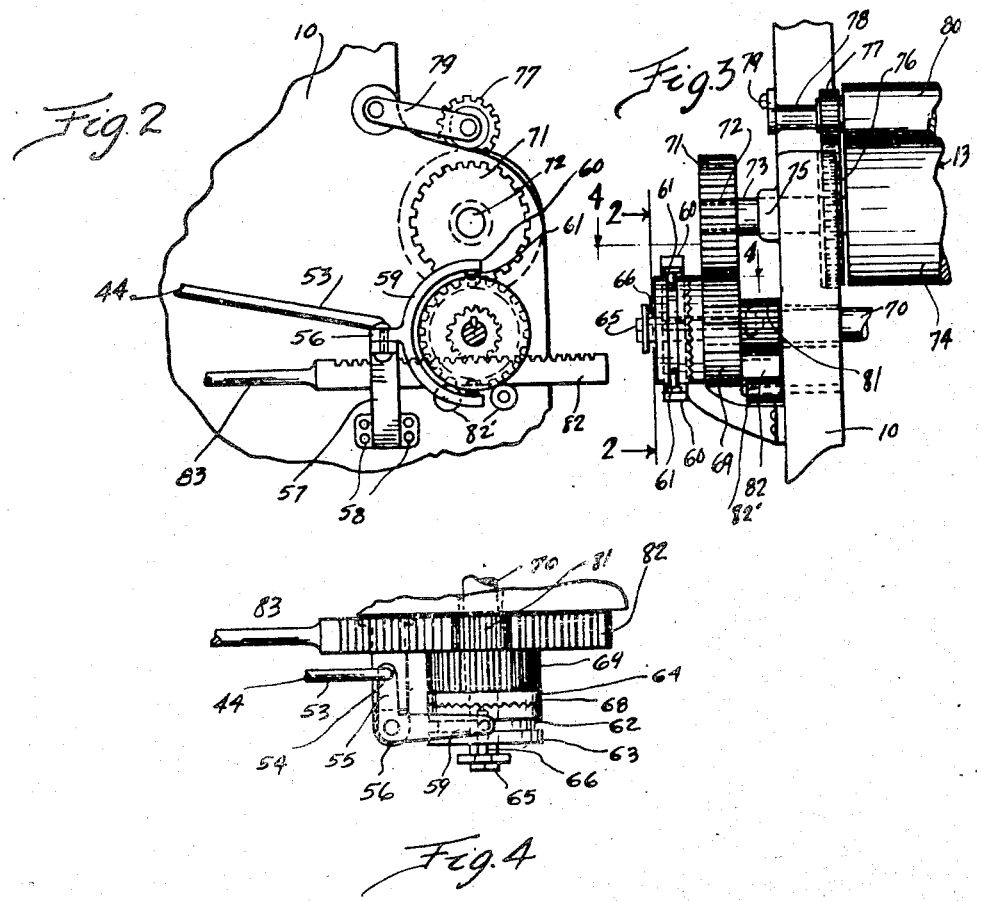
INVENTOR.
Charles H. Petskeyes
BY
His Attorney April 1, 1947.  C. H. PETSKEYES  2,418,276
BREAD WRAPPING MACHINE
Filed June 9, 1945  3 Sheets-Sheet 3

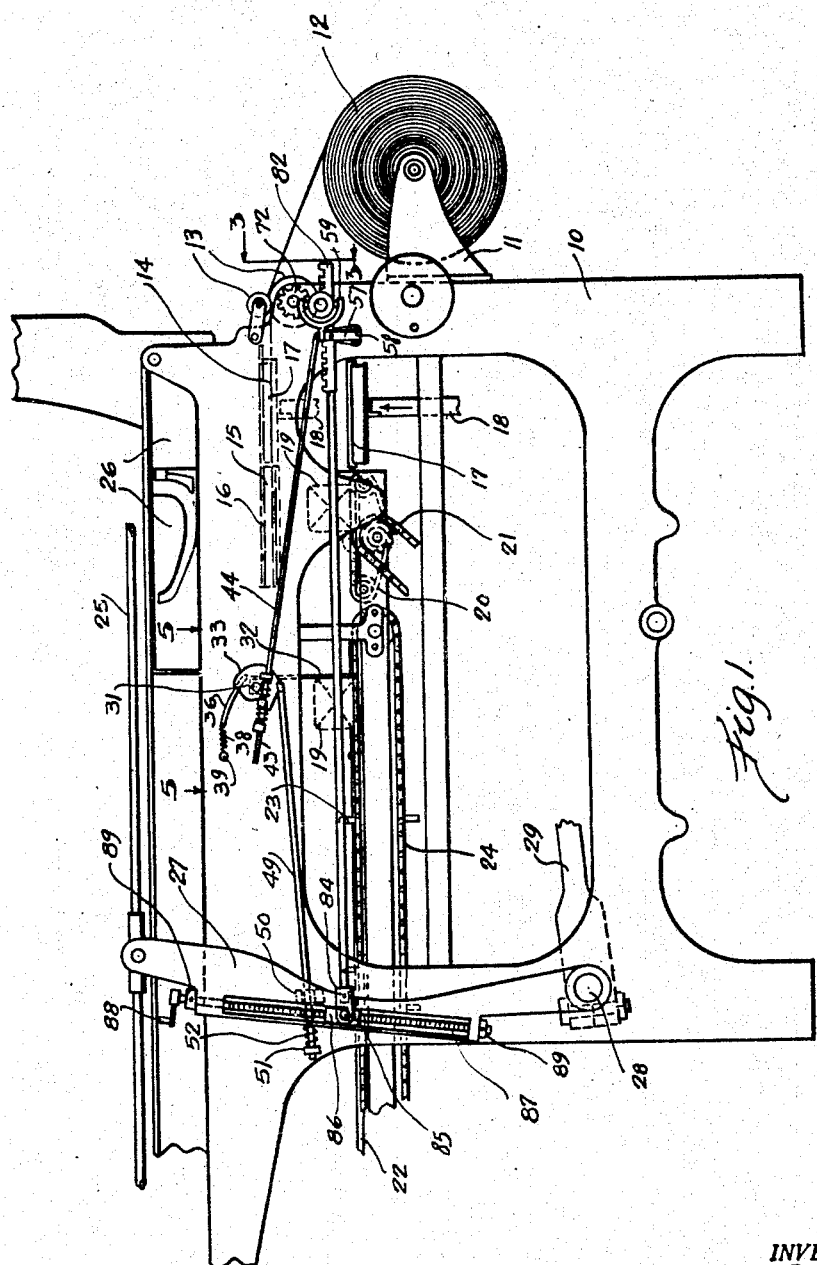

INVENTOR.
Charles H. Petskeyes
BY
His Attorney

Patented Apr. 1, 1947

2,418,276

UNITED STATES PATENT OFFICE 2,418,276

BREAD WRAPPING MACHINE

Charles H. Petskeyes, Davenport, Iowa, assignor to Gellman Manufacturing Company, Rock Island, Ill., a corporation of Illinois Application June 9, 1945, Serial No. 598,465

7 Claims. (Cl. 93—2)

This invention relates to bread wrapping machines and more particularly to an arrangement for automatically stopping operation of the machine should it develop that no bread is being conveyed by the bread conveying means to an elevator for movement through the wrapping operation.

In this aspect of the invention, an object is to provide an arrangement for this accomplishment which will be highly efficient in use and economical in manufacture.

The present invention constitutes an improvement over that shown in United States Patents Nos. 2,276,590; 2,252,028; 2,235,503; 2,232,558 and 2,230,797.

In bread wrapping machines such as disclosed and operated in accordance with the aforesaid patents, paper is automatically fed through a plane constituting the upward movement of a sliced loaf of bread, during which movement the bread is wrapped by means such as disclosed in the aforesaid patents, by a suitable web of paper. This upward movement of the bread is brought about by a vertically movable elevator to which the loaf of bread is transmitted by a suitable conveying means which receives the bread from the bread slicing machine.

In a bread wrapping machine operated in the above manner, particularly where the wrapping paper is automatically projected into wrapping position through the plane of movement of the bread, it is manifest that if no bread is being conveyed by the moving conveying means to the movable elevator, the paper will be uselessly fed to the wrapping area of the machine and a considerable amount of paper may be lost before the operator discovers the existence of this condition. This invention has for its principal object the provision of mechanism controlled in its operation by the movement of the bread by the conveying means in a manner such that if no bread is being conveyed, the paper will not be projected into the bread wrapping area, but only upon the presence of a loaf of bread in the conveying means is the projection of the paper web into the wrapping area effected.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a side elevational view of a bread wrapping machine illustrating my improvements associated therewith;

Fig. 2 is a side elevational view taken substantially on line 2—2 of Fig. 3;

Fig. 3 is a fragmentary end elevational view taken substantially on line 3—3 of Fig. 1;

Fig. 4 is a fragmentary detail view taken substantially on line 4—4 of Fig. 3;

Figure 5:
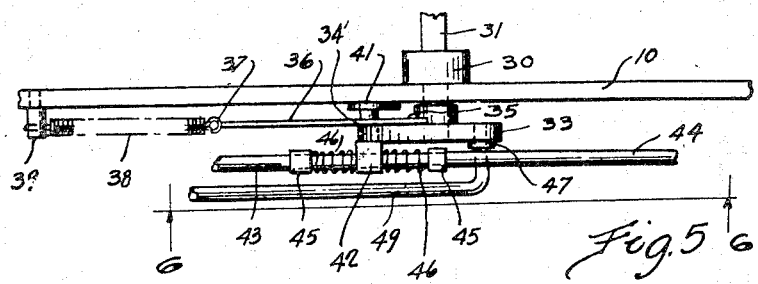
Fig. 5 is a fragmentary detail view taken substantially on line 5—5 of Fig. 1.

The drawings illustrate the preferred form of construction by which the several objects of my invention are accomplished. A conventional bread wrapping machine such as illustrated in the aforementioned patents comprises a suitable frame structure 10 from which projects brackets 11 between which is supported a roll of paper 12. This roll of paper 12 is payed between feed rollers 13 so that a web portion 14 thereof will be projected between the plates 15 of a table 16 and across the plane of movement of a loaf of bread, which is in a vertical direction. The loaf of bread is moved in this vertical direction by an elevator 17, operated by a suitable reciprocatory standard 18.

To this elevator 17 the loaves of bread 19 are fed by a transfer conveyor 20 comprising a sprocket chain driven by a driver chain 21.

To this transfer conveyor the loaves of bread are conveyed from the bread slicing machine (not shown) along a platform 22 by followers 23 carried by sprocket chains 24.

After the bread has been wrapped in the manner disclosed in the aforesaid patents, it is removed from the elevator by a suitable follower (not shown) operated by a reciprocatory rod 25, the loaves of bread being conveyed by such follower between final fold plates 26, the construction and operation of which fold plates is best illustrated in the aforementioned patents and constitutes no part of the present invention. This reciprocatory rod 25 is moved by a rocker bar 27. This rocker bar 27 is connected to a rocker shaft 28 which is rocked by a rocker arm 29, the arm 29 being rocked by means of a suitable cam arrangement (not shown) and constituting no part of the present invention.

On the side frame 10 of the wrapping machine there is formed a boss 30, and journaled in this boss 30 is a rocker shaft 31 which extends transversely of the conveyor 22. Depending from this shaft 31 is a trip plate 32 adapted to be engaged by the sliced loaf of bread 19 in the manner shown in Fig. 1. On this shaft 31 is fixed a cam disc 33 having a notch portion 34 and a shoulder 34'. Secured to the cam disc 33 is an arm 36, as at 35. To this arm 36 is attached one end 37 of a spring 38, the opposite end of the spring being connected as at 39 to the side frame 10.

Figure 6:
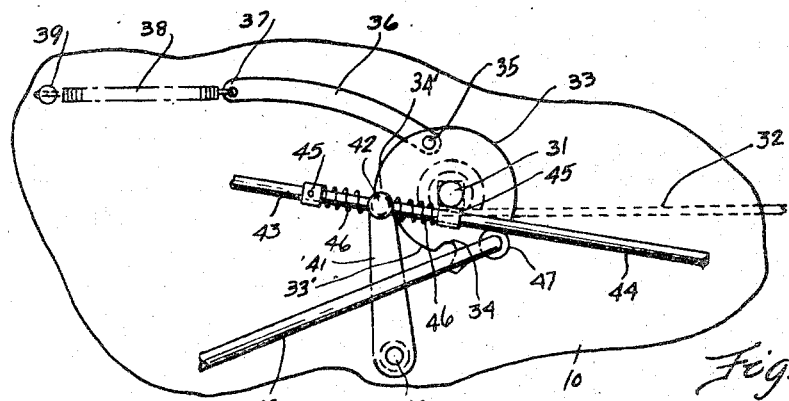
Fig. 6 is a fragmentary side elevational view taken substantially on line 6—6 of Fig. 5.

Connected as at 40 (Fig. 6) to the frame 10 is a link 41, and the upper end portion of this link 41 carries a stud 42 which is adapted to engage, under certain conditions, in the notch 34 of the cam disc 33. Projected through this stud 42 is the end portion 43 of a rod 44. On this end portion 43 of the rod 44 are collars 45 spaced from each other on opposite sides of the stud 42 and between the studs and these collars 45 are positioned cushion springs 46.

The cam disc 33 has an extended portion 47 and connected to this extended portion 47 is the end 48 of a rod 49. This rod 49 extends through a suitable bearing 50 provided by the rocker, and between this bearing 50 and the nut carried by the rod 49 is a cushion spring 52. The rod 44 has its end portion 53 connected as at 54 (Fig. 4) to an arm 55 of a bell crank 56, the bell crank 56 being supported by a bracket 57 secured to the side frame 10 as at 58. This bell crank 56 provides a yoke 59, and depending from the ends 60 of this yoke 59 are pins 61 which engage in grooves 62 of one section 63 of a clutch 64. This clutch section 63 is slidably mounted upon a stud shaft 65 and is keyed thereto for rotation therewith by means of a suitable key 66. The opposing faces 67 of the clutch sections 63 and 64 are provided with teeth 68 which are adapted, when meshing together, to provide driving connections between the sections 64 and 63.

The clutch section 64 is formed as an integral part of a gear 69 rotatable on the end portion of a shaft 70 and operatively meshing with a gear 71 fixed on the end portion 72 of a shaft 73 carrying a feed roller 74, the shaft 73 being journaled in suitable bearings 75 provided by the side frames 10. On this shaft 73 there is mounted a gear 76 which meshes with a suitable gear 77 mounted on a shaft 78 journaled in suitable brackets 79 carried by the side frames, as shown in Figs. 2 and 3. On this shaft 78 is a pressure roller 80 which cooperates with the feed roller 74 to feed the roll of paper to the paper table 16, as shown in Fig. 1, after which the web is severed from the roll by suitable means, such for example that disclosed in the aforesaid patents, said paper web severing means constituting no part of the present invention.

On the shaft 70 there is mounted a gear 81 formed as an integral part thereof and operatively meshing with a rack bar 82. This rack bar 82 is formed as a part of a rod 83, the opposite end of which (Fig. 1) is connected to a suitable coupling 84. This rack bar 82 is supported upon suitable rollers 82' carried by the frame 10.

This coupling 84 is pivotally connected as at 85 to a block 86 mounted for longitudinal movement upon a screw shaft 87. This shaft 87 is carried by the rocker arm 27 and is manipulated through the medium of a suitable handle 88, the opposite end portions of the shaft having secured thereto suitable collar 89 to maintain the same in fixed relation with respect to the rocker arm 27.

As before stated, the loaves of bread in sliced form are received from the bread slicing machine (not shown) upon the platform 22 and thence conveyed therealong by the followers 23.

Figure 7:
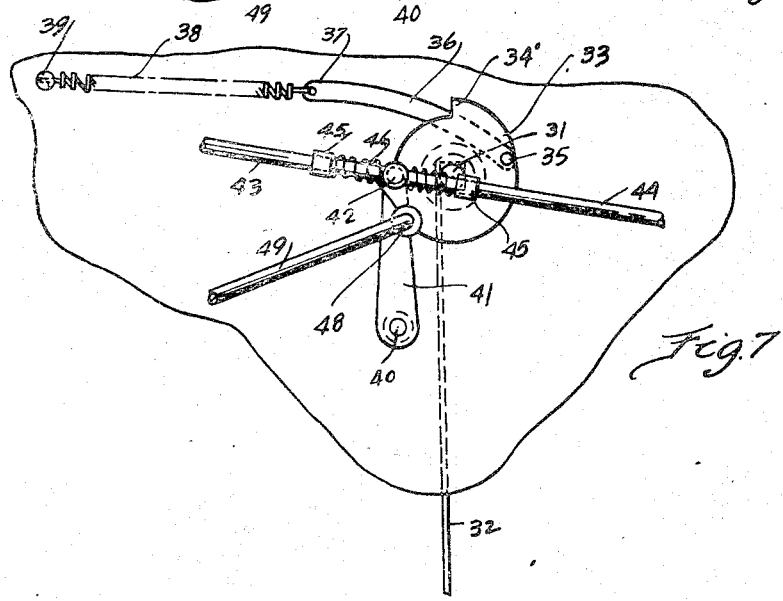
Fig. 7 is a fragmentary side elevational view taken substantially similar to Fig. 6, but showing the parts in different relation with respect to each other.

Referring to Fig. 7, when the cam disc 33 is disposed in the position there shown, with the trip plate 32 extending vertically, the stud 42 will be engaged in the notch 34 and the rocker arm 27 will be in its forwardmost position, that is, a position to the right as viewed in Fig. 1. As the loaf of bread is conveyed along the platform 22, it will be brought into contact with the trip plate 32. The engagement between the trip plate 32 and the loaf of moving bread 19 will cause the shaft 31 to pivot in an anticlockwise direction. This pivotal movement of the shaft 31 will cause the stud 42 to ride upon the high point 33' of the cam into engagement with the stop shoulder 34' and thus effect a rearward movement of the rod 44. As this rod moves rearwardly, that is, to the left as viewed in Fig. 1, such rearward movement will effect pivotal movement of the bell crank 55 and consequently shift the clutch section 63 into meshing engagement with the clutch section 64. Upon engagement of the clutch section 63 with the clutch section 64, the shaft 70 and gear 69 will be operatively connected together. The shaft 70 is rotated by movement of the rack bar 82, in turn moved by pivotal movement of the rocker arm 27, this movement of the rocker arm being imparted by operation of the reciprocatory rod 25. Rotation of the gear 69 will impart rotation to the gear 71. This rotation of the gear 71 will cause the rotation of the roller 74 to project a web of paper 14 into the position shown in Fig. 1 through the plane of movement of the elevator 17. When the clutch section 63 is disengaged from the clutch section 64, movement of the rack bar 82, by pivotal movement of the rocker arm 27, will effect rotation only of the shaft 70, the gear 69 remaining idle during this phase of operation. In its return movement to the left, as viewed in Fig. 1, the rocker arm 27 will compress the spring 52. This compressing of the spring 52 will continue until the spring has compressed to the point where it will effect movement of the rod 49 likewise to the left. This movement of the rod 49 to the left will rotate the cam disc 33 in a clockwise direction back to the position shown in Fig. 7. From this simple arrangement, it is apparent that the paper web will be projected only between the feeding mechanism 13 as and when a loaf of bread trips the plate 32.

The simplicity of construction of the invention is apparent from the foregoing description.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. In a machine of the class described, the combination with a platform upon which an article is adapted to be moved, of a rocker arm, paper feeding means, clutch means providing connection between said rocker arm and said paper feeding means, means operable by movement of said articles to connect the clutch means and the paper feeding means, and means operable by movement of said rocker arm in one direction for disconnecting the clutch means and said paper feeding means.

2. In a machine of the class described, the combination with a platform upon which an article is adapted to be moved, of a rocker arm, paper feeding means, means for connecting said rocker arm and said paper feeding means including clutch sections one of which being adapted to be moved into and from interlocking engagement with the other section, a rotatable cam, means actuated by said cam when the latter is rotated in said one direction for moving said clutch sections in a direction for engagement with respect to each other, means operable by movement of said article for rotating said cam in said one direction, and means operable by movement of said rocker arm in one direction to rotate said cam in an opposite direction to move said clutch sections from engagement with respect to each other.

3. In a machine of the class described, the combination with a platform upon which an article is adapted to be moved, a rocker shaft, a cam on said rocker shaft, a trip plate extending from said rocker shaft into the path of movement of said article upon said platform for rocking said shaft in one direction, paper feeding means, a rocker arm, means for connecting said rocker arm and said paper feeding means including clutch sections one of which being adapted to be moved into and from interlocking engagement with the other section, means actuated by said cam when the rocker shaft is rocked in said one direction for moving said clutch sections into engagement with respect to each other, means providing connection between the cam and the rocker arm for rotating the cam in an opposite direction to disengage said clutch sections from each other.

4. In a machine of the class described, the combination with a platform upon which an article is adapted to be moved, a rocker shaft, a cam on said rocker shaft, a trip plate extending from said rocker shaft into the path of movement of said article upon said platform for rocking said shaft in one direction, paper feeding means, a rocker arm, means for connecting said rocker arm and said paper feeding means including a rack bar and pinion connection and a clutch comprising sections one of which sections being adapted to be moved into and from interlocking engagement with the other section, means actuated by said cam when the rocker shaft is rocked in said one direction for moving said clutch sections into engagement with respect to each other, means providing connection between the cam and the rocker arm for rotating the cam in an opposite direction to disengage said clutch sections from each other.

5. In combination, a rocker shaft adapted to be rocked in one direction by a moving article, a cam on said rocker shaft and movable therewith, paper feeding means, a rocker arm, a rack bar, means connecting the rack bar with the rocker arm, clutch means for connecting the rack bar to the paper feeding means including sections movable into and from engagement with respect to each other, means connecting one of said clutch sections to said cam for moving said one of said clutch sections into engagement with the other of said clutch sections, and means connecting said cam to said rocker arm for rotating said cam in one direction when said rocker arm is rocked in one direction to disengage said clutch sections.

6. In combination, a rocker shaft adapted to be rocked in one direction by a moving article, a cam on said rocker shaft and movable therewith, paper feeding means, a rocker arm, a rack bar, means connecting the rack bar with the rocker arm, clutch means for connecting the rack bar to the paper feeding means including sections movable into and from engagement with respect to each other, means connecting one of said clutch sections to said cam for moving said one of said clutch sections into engagement with the other of said clutch sections, including a slidable yoke, and means connecting said cam to said rocker arm for rotating said cam in one direction when said rocker arm is rocked in one direction to disengage said clutch sections.

7. In combination, paper feeding means, a rocker arm, a clutch for connecting the paper feeding means and the rocker arm, means connecting the clutch to the rocker arm including a cam, a rocker shaft supporting the cam and having a depending member adapted to be engaged by a moving article to move the rocker shaft in one direction for moving said clutch in a direction to connect the rocker arm and the paper feeding means, said connection between said clutch and the rocker arm serving to rock said cam in an opposite direction when said rocker arm is moved in said one direction to move said clutch in a direction to disengage the feeding means from the rocker arm.

CHARLES H. PETSKEYES.

REFERENCES CITED

The following references are of record in the file of this patent:

UNITED STATES PATENTS

| Number | Name | Date |
|---|---|---|
| 1,182,393 | Luttropp | May 9, 1916 |
| 1,270,416 | Johnson | June 25, 1918 |
| 1,416,165 | Brownell | May 16, 1922 |